United States Patent
Faust et al.

(10) Patent No.: US 6,170,508 B1
(45) Date of Patent: Jan. 9, 2001

(54) FLUID FLOW REGULATING VALVE AND METHOD

(75) Inventors: Hartmut Faust, Bühl-Moos; Benjamin Kemmner, Baden-Baden; Günter Ebinger, Rheinmünster; Urban Panther, Seelbach; Manfred Homm, Bühl-Neusatz, all of (DE)

(73) Assignee: LuK Getriebe-Systeme GmbH, Bühl/Baden (DE)

( * ) Notice: Under 35 U.S.C. 154(b), the term of this patent shall be extended for 0 days.

(21) Appl. No.: 09/349,027

(22) Filed: Jul. 7, 1999

(30) Foreign Application Priority Data

Jul. 7, 1998 (DE) .............................. 198 30 287
Aug. 14, 1998 (DE) .............................. 198 36 910

(51) Int. Cl.[7] .............................. F16K 11/07; F16K 17/04
(52) U.S. Cl. ................. 137/12; 137/115.03; 137/115.07; 137/115.22; 137/115.23
(58) Field of Search ........................ 137/115.03, 115.07, 137/115.22, 115.23, 312, 1, 12

(56) References Cited

U.S. PATENT DOCUMENTS

| | | | | |
|---|---|---|---|---|
| 3,033,277 | * | 5/1962 | Cowles et al. | 137/115.03 |
| 3,592,216 | * | 7/1971 | McMillen | 137/115.03 |
| 3,916,934 | * | 11/1975 | Koenig | 137/115.03 |
| 3,920,034 | * | 11/1975 | Byers, Jr. | 137/115.03 |
| 4,388,941 | * | 6/1983 | Riedhammer | 137/82 |
| 5,217,412 | | 6/1993 | Indlekofer et al. | |
| 5,667,448 | | 9/1997 | Friedmann | |
| 5,711,730 | | 1/1998 | Friedman et al. | |

\* cited by examiner

*Primary Examiner*—Stephen M. Hepperle
(74) *Attorney, Agent, or Firm*—Darby & Darby

(57) ABSTRACT

A valve for regulating the rate of flow and/or the pressure of oil flowing to a transmission or another consumer in the power train of a motor vehicle has a piston which defines with the valve housing a chamber for one or more springs and for oil being admitted through a first inlet by way of a first conduit containing a first throttle. A second inlet admits pressurized oil from a pump, and such oil can be admitted into the consumer by way of a first outlet and a second conduit containing a second throttle and supplying oil to the first conduit. A second outlet can deliver oil from the second inlet to the sump in response to shifting of the piston. A hydraulic seal is established between the piston and the housing intermediate the chamber and the second outlet to prevent leakage of oil from the chamber into the second outlet. Oil leaking from the chamber could adversely influence the characteristics of oil flowing into the consumer.

20 Claims, 8 Drawing Sheets

FLUID FLOW REGULATING VALVE AND METHOD

BACKGROUND OF THE INVENTION

The present invention relates to valves in general, and more particularly to improvements in fluid flow regulating valves (especially volumetric fluid flow regulating valves). The invention also relates to improvements in methods of regulating the flow of fluids, for example, to the fluid-consuming or fluid-operated components of power trains in motor vehicles.

A continuously variable transmission (CVT) of the type often utilized in the power trains of motor vehicles normally comprises several fluid-operated components, e.g., hydraulic cylinder and piston units for the adjustable flanges of pulleys, for torque sensors, for lubricating devices and/or others. Reference may be had, for example, to commonly owned U.S. Pat. No. 5,711,730 granted Jan. 27, 1998 to Oswald Friedmann et al. for "TORQUE MONITORING APPARATUS".

Volumetric fluid flow regulating valves (hereinafter called flow regulating or flow control valves for short) are utilized when the flow of a working fluid (e.g., oil) to a hydraulic cylinder or another consumer of hydraulic fluid must be influenced to shift, or to permit shifting of, the position of a piston or another mobile valving element. For example, it is often desirable or necessary to divert a given percentage of oil from a stream which is being made available by the outlet of an oil pump, and to convey the diverted percentage to a consumer in a transmission, whereas the remainder of the oil stream is compelled to circulate, e.g., along an endless path defined, for example, by a pump circuit.

As a rule, a flow regulating valve has a well-defined so-called no-regulation point, namely a condition when the pressure of hydraulic fluid being supplied to a consumer remains at least substantially constant regardless of whether the quantity (volume) of pressurized fluid being supplied by the outlet of the pump continues to increase.

A standard flow regulating valve normally comprises a housing or body for a normally piston-shaped valving element which is reciprocably confined in an elongated passage (e.g., a bore or hole) of the housing. A spring reacts against the housing at one end of the passage to bear upon the adjacent end portion of the piston and to thus urge the entire piston toward the other end of the passage. A flow restrictor is employed to establish a difference or to change the difference between the fluid pressures at the two ends of the valving element (hereinafter piston for short), e.g., when it becomes necessary to change the axial position of the piston relative to the housing. The latter has an outlet which receives fluid with assistance from or against the resistance of one or more valve springs when the quantity of pressurized fluid being supplied to the inlet by the pump exceeds the requirements of one or more consumers, i.e., the piston then assumes an axial position in which the consumer or consumers continues or continue to receive an optimum quantity of pressurized fluid whereas the surplus is caused to circulate along an endless path which can be defined in part by a source of fluid (e.g., a sump or another suitable reservoir) for the pump.

The aforementioned no-regulation point constitutes an important parameter because the volumetric flow of hydraulic fluid to the consumer(s) must be considered in designing the entire system (such as the power train in a motor vehicle). The volumetric flow constitutes an input parameter. Any changes (shifting) of the input parameter can exert a negative influence upon the operation of the system, primarily because a shifting of the input parameter prevents the establishment of an optimum or desirable volumetric flow.

Furthermore, due to the characteristics of the mode of operation of the consumer or consumers which receives or receive hydraulic fluid from the volumetric fluid flow regulating valve, the pressure of fluid reaching the consumer(s) can exceed a threshold value in response to shifting of the aforementioned no-regulation point. This causes the flow restrictor to initiate the establishment of a certain pressure drop. This, in turn, results in the establishment of an excessive pressure differential between the chamber for the aforementioned spring or springs at one axial end, and a second chamber at the aforementioned outlet (to the fluid circulating arrangement) of the housing in spite of the pressure drop which is caused by the flow restrictor, when the aforementioned pressure differential exceeds a certain value. This results in the establishment of a flow of leak fluid from the chamber for the spring(s) at one axial end of the piston and the outlet lading to fluid circulating arrangement.

The fluid which leaks from the spring-containing chamber is part of the fluid which is intended to reach the consumer (s). Such leakage results in a shifting of the operating point, and the end result is a change in the operation of the consumer or consumers.

If the quantity of fluid being supplied by the pump to the regulating valve frequently and greatly exceeds the quantity of fluid that is required for proper operation of the consumer (s), the regulating valve must carry out appropriate adjustments between the quantity of the fluid flowing to the consumer(s) and the quantity of fluid which is being recirculated along a predetermined path at frequent intervals. If the regulating valve is utilized in the power train of a motor vehicle, such frequent adjustments take place when the pump which supplies pressurized fluid to the valve is driven by the prime mover (e.g., a combustion engine) of the motor vehicle, the valve must be adjusted (more specifically, the quantity of fluid which is fed into the endless path must be changed) in response to each increase (or each pronounced increase) of the engine RPM. Thus, the piston is compelled to perform frequently recurring oscillatory or reciprocatory movements in the passage defined by the housing of the regulating valve. Since the piston and the valve body are normally made of a metallic material, frequently recurring movements of the piston entail the development of pronounced wear, especially at the locations where the piston is to sealingly engage the surface bounding te passage in the valve housing. The development of wear upon the piston and/or upon the valve housing aggravates the situation because it leads to a more pronounced leakage of fluid from the spring-confining chamber to the outlet of the pump housing.

Attempts to reduce the likelihood of wear upon the piston and/or upon the housing of the regulating valve, or to reduce the extent of such wear (e.g., by appropriate shaping (bevelling or rounding) of the sealing portions of the piston and/or the valve housing) have met with limited (if any) success. One of the reasons is that, as a rule, the conveyed and recirculated fluid (such as oil) normally contains solid particles that are likely to be intercepted in the narrowest portion or portions of the unavoidable clearance(s) between the periphery of the piston and the adjacent surface(s) bounding the passage of the valve housing and receiving the reciprocable piston. The intercepted solid particles are an important (even primary) cause of extensive wear, particularly upon the specially configured (such as the aforementioned rounded or bevelled) surfaces at the locations where the piston is to sealingly engage the valve housing. Excessive bevelling, rounding and/or analogous treatment of those portions of the piston and/or the valve housing where such portions are to sealingly engage or approach each other can result in a pronounced tendency of the piston to change its orientation (particularly to perform a tilting movement) relative to the valve housing. Of course, such changes of orientation of the piston in the bore or passage of the valve housing even further increase the likelihood of excessive wear, i.e., of increased flow of leak fluid from the spring-containing chamber to the outlet of the valve housing.

The just discussed tendency of the piston to change its orientation relative to the valve housing can be counteracted (to a certain extent) by increasing the axial length of the piston. However, the axial length of the piston cannot be increased at will (namely to the extent which is necessary to prevent any (or any appreciable) changes of orientation of the piston in the passage of the valve housing), especially in the power trains of motor vehicles wherein the space allotted for the transmission (such as a CVT) and its hydraulically operated constituents or auxiliary equipment) is at a premium.

OBJECTS OF THE INVENTION

An object of the invention is to provide a novel and improved regulating valve which is constructed and assembled and which can be operated in such a way that it fully or practically fully overcomes the drawbacks of the aforediscussed presently known regulating valves.

Another object of the invention is to provide a regulating valve having a useful life span which is a multiple of that of conventional valves.

A further object of the invention is to provide a regulating valve which is designed to reliably maintain the aforediscussed no-regulation point at an optimum value during the entire useful life of the consumer or consumers receiving hydralic fluid from a source (such as an engine-driven pump in a motor vehicle) by way of the improved valve.

An additional object of the invention is to provide a novel and improved method of regulating the flow of pressurized hydraulic fluid from one or more sources of pressurized fluid by way of the above outlined regulating valve.

Still another object of the invention is to provide a power train for use in motor vehicles which embodies one or more (originally installed or retrofitted) regulating valves of the above outlined character.

A further object of the invention is to provide a regulating valve wherein the leakage (and particularly pronounced leakage which could adversely influence the rate of flow and/or the pressure of hydraulic fluid to one or more consumers, e.g., to a continuously variable transmission in the power train of a motor vehicle) is reduced (including prevented) in a novel and improved (particularly simple, inexpensive and reliable) manner.

Another object of the invention is to provide a novel and improved method of preventing migrations of the aforediscussed non-regulation point for long periods of time and in a simple, reliable and inexpensive manner.

An additional object of the invention is to provide a novel and improved body or housing for use in the above outlined regulating valve.

Still another object of the invention is to provide a novel and improved regulating valve which exhibits the above outlined features and advantages and can be utilized in the power train of a motor vehicle without necessitating additional space, i.e., without contributing to the bulk of the power train.

A further object of the invention is to provide a novel and improved method of preventing any or any appreciable changes of important parameters (such as the aforediscussed no-regulation point) in spite of progressing wear upon neighboring parts of the valving element (such as a reciprocable piston) and upon the valve housing or body in a regulating valve of the above outlined character.

Another object of the invention is to provide a novel and improved method of and a novel and improved regulating valve for effectively and reliably counteracting the undesirable influence of leak fluid flowing between the valving element and the valve housing of a volumetric fluid flow regulating valve, namely of counteracting the influence of leak fluid to such an extent that the location or reaching (timing) of the no-regulation point remains at least substantially unchanged for long periods of time.

An additional object of the invention is to provide a novel and improved "hydraulic seal" for utilization in a regulating valve of the above outlined character, particularly to counteract the undesirable influence of developing and progressing wear upon the valving element and/or the body or housing of the improved regulating valve.

Still another object of the invention is to provide a method of ensuring long-lasting satisfactory operation of transmissions (such as continuously variable transmissions) and/or other consumers of pressurized hydraulic fluid in the power trains of motor vehicles.

A further object of the invention is to accomplish at least some of the above-enumerated objects by relying on the available system pressure and/or on the available operating pressure of the hydraulic fluid.

SUMMARY OF THE INVENTION

One feature of the instant invention resides in the provision of a volumetric fluid flow regulating valve which comprises a body or housing having a passage (e.g., an elongated bore or hole), at least one inlet arranged to receive pressurized hydraulic fluid from a suitable source (e.g., an oil pump), a first outlet connectable to a reservoir (e.g., to a sump), and a second outlet. The improved valve further comprises a valving element (such as an elongated piston) which is reciprocable in the passage and has first and second end portions respectively adjacent first and second chambers forming part of the aforementioned passage. The valving element is movable relative to the housing between first and second positions in which the first and second outlets respectively receive fluid from the at least one inlet of the valve housing. Still further, the valve comprises energy storing means (e.g., a single coil spring) provided in the first chamber to bias the valving element in a direction to reduce the volume of the second chamber, means (e.g., a first conduit) for connecting the at least one inlet or the second outlet (in the second position of the valving element) with the second chamber so that the fluid pressure in the second chamber can match or at least approximate the fluid pressure at the outlet of the source, at least one fluid pressure reducing device (such as a throttle, a diaphragm or another suitable flow restrictor) in a second conduit which connects the second outlet with at least one consumer, means for connecting the first chamber with the second conduit downstream (i.e., at the lower-pressure side) of the pressure reducing device, and means for at least reducing leakage (provided that there is leakage) of fluid between the first chamber and the first outlet. Such reduction or prevention of leakage of hydraulic fluid from the (first) chamber for the energy storing means into the reservoir greatly reduces the likelihood of undesirable changes in one or more parameters (such as the quantity and/or pressure) of fluid flowing from the second outlet, through the second conduit and into the consumer or consumers.

If the pressure of hydraulic fluid in the first chamber differs from fluid pressure in or at the first outlet of the valve housing, the leakage reducing means can include means for at least reducing the differential between the fluid pressures in the first chamber and the first outlet.

The internal surface of the housing (namely the surface surrounding the passage for the valving element) includes a portion which extends between the first chamber and the first outlet, and the leakage reducing means can include means for maintaining between the aforementioned portion of the internal surface and the adjacent portion of the periphery of the valving element a fluid pressure which at least approximates fluid pressure in the second outlet. Such means for maintaining can include at least one bore or hole or channel (hereinafter called bore) provided in the valving element. The at least one bore can be parallel with or inclined relative to the longitudinal axis of the valving element.

In addition to or in lieu of the aforementioned bore of the valving element, the means for maintaining can include at least one groove (such as a circumferentially complete groove) in the internal surface of the valve body. The configuration and/or the orientation of the at least one groove can be selected in such a way that at least a portion of the at least one groove is at least substantially parallel to the longitudinal axis of the valving element.

Alternatively, the means for maintaining can comprise a bore provided in the valving element and communicating with the at least one inlet at least in the second position or positions of the valving element, and at least one annular groove provided in the internal surface of the valve housing and/or in the external surface of the valving element and communicating with the bore.

The energy storing means can comprise one or more suitable springs, and the first end portion of the valving element can be provided with means for centering the spring or springs in the first chamber. For example, if the energy storing means comprises a cylindrical or conical coil spring, the centering means can comprise a conical, pyramidal or otherwise configurated protuberance projecting from an end face of the first end portion of the valving element.

The at least one consumer can comprise a transmission, e.g., a continuously variable transmission (CVT).

Another feature of the invention resides in the provision of a method of preventing a rise of the pressure of a fluid (particularly oil or another suitable hydraulic fluid) above a preselected threshold value in a regulating valve wherein a housing or body has an elongated passage for a reciprocable valving element having first and second end portions. The housing is further provided with at least one inlet for a pressurized fluid, and with first and second outlets which are respectively connectable to a reservoir and to at least one consumer. The passage respectively includes first and second chambers at the respective end portions of the valving element, and the first chamber confines at least one energy storing device which serves to urge the valving element in a direction to reduce the volume of the second chamber.

The improved method comprises the steps of establishing a path (e.g., by means of one or more bores, grooves and/or the like) for the flow of leak fluid (if any) between the first chamber and the first outlet, and maintaining the pressure of fluid in the path at a value which at least approximates the pressure of fluid in or at the second outlet.

The first (path establishing) step can comprise setting up an at least substantially circumferentially complete path in the valving element and/or in the valve housing. The method can further comprise the step of pumping the pressurized fluid into the at least one path by way of the at least one inlet in the housing of the regulating valve.

A further feature of the invention resides in the provision of a volumetric fluid flow regulating valve which comprises a housing having a passage (such as an elongated bore having a smaller-diameter portion and a larger-diameter portion), first and second inlets arranged to receive a pressurized fluid, a first outlet connectable to a reservoir, and a second outlet. The valve further comprises a valving element which is reciprocable in the passage and has (a) a first surface having a first area and defining with the valve housing a first fluid-containing chamber communicating with the first inlet, (b) a second surface having a second area and defining with the valve housing a second fluid-containing chamber, and (c) a peripheral recess. The valve further comprises means for supplying to the first chamber fluid at a first pressure, a source of pressurized fluid connected to the second inlet, and means for maintaining the fluid in the second chamber at a regulating pressure. The valving element is movable in the passage between at least one first position in which the second inlet communicates with the second outlet and at least one second position in which the second inlet communicates with the first outlet. The ratio of the first area to the second area at least approximates the ratio of the first pressure to the regulating pressure, and the valve further comprises a first flow restrictor provided in or otherwise associated with the means for supplying fluid to the first chamber, and a second flow restrictor provided in or otherwise associated with a conduit which forms part of the means for maintaining the fluid in the second chamber at the aforementioned regulating pressure. The first and second flow restrictors respectively define first and second orifices for the flow of fluid to the respective chambers, and the ratio (K) of the areas (effective cross sections) of the first and second orifices corresponds to a factor of the ratio (V) of the area of the first surface to the area of the second surface. The ratio $Q_{VST}/Q_{ST}$ of the volumes of leak fluid flow (if any) through the first orifice and the second orifice is also a function of the ratio K. It further applies that K>1 when V>1 and Q>1.

The ratio K can be ascertained on the basis of the equation $K=V^{1/4} \cdot (Q_{VST}/Q_{ST})^{1/2}$ wherein V is the ratio of the area of the first surface to the area of the second surface, $Q_{VST}$ is the volumetric flow of leak fluid through the first orifice, and $Q_{ST}$ is the volumetric flow of leak fluid through the second orifice.

Still another feature of the present invention resides in the provision of a method of compensating for temperature-induced changes of a regulating fluid pressure established by a regulating valve which is operated by fluid that is maintained at a pilot pressure and is supplied by a first conduit containing a first flow restrictor, and wherein a valve housing or body defines a passage for a reciprocable valving element having a first surface defining with the housing a first chamber serving to receive fluid at the pilot pressure from the aforementioned first conduit by way of a first inlet of the housing. The housing further comprises a second inlet which is connectable with a source of regulating fluid, a first outlet and a second outlet. The valving element has a second surface which defines with the housing a second chamber receiving fluid at regulating pressure by way of a second flow restrictor in a second conduit, and the valving element is further provided with a recess (e.g., a circumferentially complete groove provided in the peripheral surface of the valving element) serving to establish communication between the first chamber and the first outlet in at least one first position of the valving element, and between the second inlet and the second outlet in at least one second position of the valving element. The improved method comprises the steps of (a) maintaining the ratio of pilot pressure to regulating pressure at least close to the ratio of the area of the first surface to he area of the second surface, and (b) maintaining the ratio of the orifice size in the first flow restrictor to the orifice size in the second flow restrictor at a value at which the influences of pressure losses at the orifices due to leakage (if any) of fluid between the housing and the valving element upon the regulating pressure at least substantially balance each other.

The pressure of fluid which fills the second chamber and bears upon the second surface of the valving element opposes the pressure of fluid upon the first surface of the valving element in the first chamber.

The method can further comprise the step of biasing the valving element for movement relative to the valve housing in a direction to increase or reduce (preferably increase) the volume of the first chamber.

Still further, the method can include the step of sealing (e.g., hydraulically sealing) the valving element against the valve housing in that portion of the passage in the valve housing which extends between the first chamber and the first outlet of the valve housing. Such seal serves to prevent escape of hydraulic fluid from the first chamber into the aforementioned reservoir (e.g., a sump which supplies hydraulic fluid to the intake of a pump serving as a source of pressurized fluid and having its outlet connected with the second inlet of the valve housing).

The second outlet of the valve housing can be connected to one or more consumers of hydraulic fluid which must or should receive fluid at the regulating pressure. For example, the consumers can include hydraulic cylinder and piston units which serve to change the axial positions of and/or to select the bias upon axially adjustable conical flanges forming part of pulleys for the endless flexible belt or chain of a continuously variable transmission (CVT), such as the transmission disclosed in the aforementioned commonly owned U.S. Pat. No. 5,711,730 to Oswald Friedmann et al. or in commonly owned U.S. Pat. No. 5,217,412 granted Jun. 8, 1993 to Norbert Indlekofer et al. for "CONTINUOUSLY VARIABLE SPEED TRANSMISSION" or in commonly owned U.S. Pat. No. 5,667,448 granted Sep. 16, 1997 to Oswald Friedmann for "POWER TRAIN".

The disclosures of the commonly owned German priority applications Serial Nos. 198 30 287.8-12 (filed Jul. 7, 1998) and 198 36 910.7-52 (filed Aug. 14, 1998) are incorporated herein by reference. Furthermore, the disclosure of each and every U.S. patent and of each and every U.S. patent application (if any) which is identified in the specification of the present application is to be interpreted as having been incorporated herein by refence, i.e., to be considered as forming part of the specification of the present application.

The novel features which are considered as characteristic of the present invention are set forth with requisite particularity in the appended method and apparatus claims. The improved volumetric fluid flow regulating valve itself, however, both as to its construction and the mode of assembling the same, as well as the method which can be carried out by resorting to such valve, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
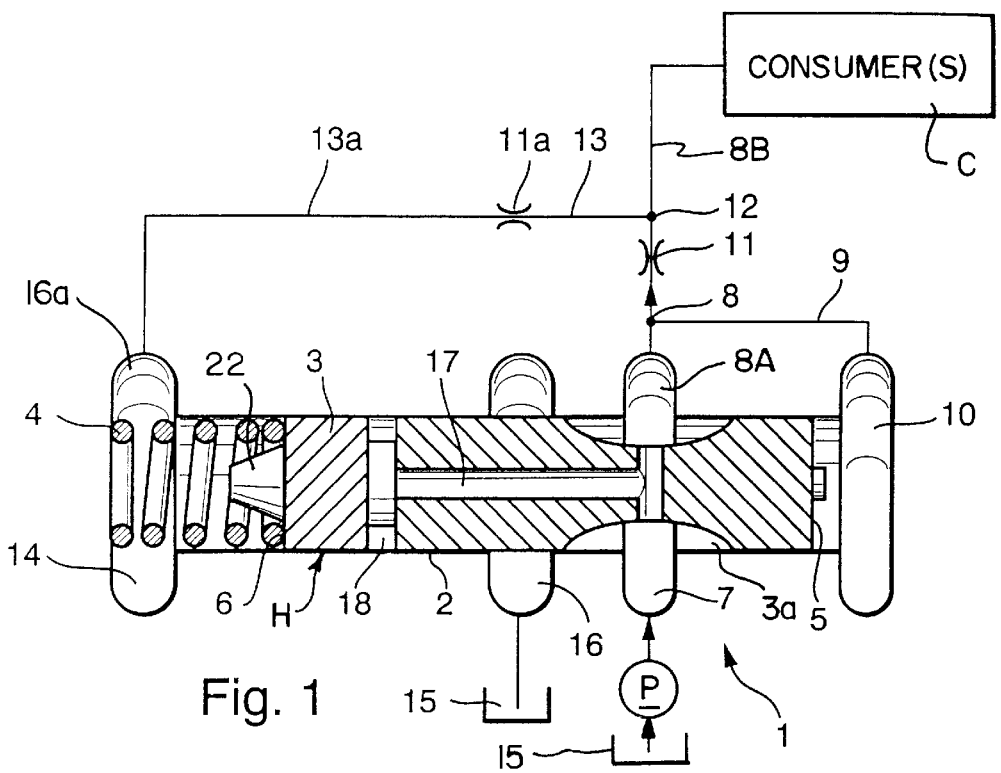
FIG. 1 a fragmentary diagrammatic partly elevational and partly sectional view of a regulating valve which embodies one form of the invention.

FIG. 1 shows certain relevant details of a regulating valve 1 which embodies one form of the present invention. The valve has a housing or body H which defines an elongated passage 2 (such as a cylindrical bore or hole) for a reciprocable valving element 3, such as a piston and hereinafter called piston. The left-hand end portion of the piston 3 has an end face 6 and defines with the housing H a first chamber 14 forming part of the passage 2 and containing a supply of hydraulic fluid (such as oil) at a first pressure (pilot pressure).

The chamber 14 contains energy storing means 4 serving to bias the piston 3 axially in a direction to the right, as viewed in FIG. 1, namely in a direction to reduce the volume of a second chamber 10 defined by the housing H and the end face 5 of the piston. The illustrated energy storing means 4 is a single cylindrical coil spring reacting against the housing H and bearing upon the end face 6 of the piston 3; the bias of this spring is assisted by pilot pressure of hydraulic fluid which fills the chamber 14 and bears upon the end face 6.

The end face 6 has a centrally located frustoconical protuberance 22 serving as a means for centering the coil spring 4 in the chamber 14. It will be appreciated that the spring 4 can be replaced with or used jointly with any other suitable biasing means which can urge the piston 3 in a direction to increase the volume of the chamber 14.

The housing H has an inlet 7 which receives pressurized fluid from a source P, such as an oil pump. The latter has an intake dipping into a reservoir 15 (e.g., a sump) serving as a source of fluid to be pressurized by the pump P. The latter can be replaced by or utilized jointly with one or more accumulators, one or more valves and/or other suitable means capable of ensuring that the inlet 7 receives hydraulic fluid at system pressure.

The housing H further comprises an outlet 8A which can receive fluid at system pressure from the inlet 7 when the piston 3 is caused to assume one or more first axial positions relative to the housing (including the position shown in FIG. 1). To this end, the peripheral surface of the piston 3 has a circumferentially extending recess 3a which can establish communication between the inlet 7 and the outlet 8A or between the inlet 7 and an outlet 16 leading to the reservoir (sump) 15, depending on the selected axial position of the piston.

The outlet 8A is connected to the intake end of a conduit 8B serving to convey fluid at a regulated pressure to one or more consumers C, e.g., to one or more hydraulic cylinder and piston units of a continuously variable transmission (CVT) in the power train of a motor vehicle. The conduit 8B supplies pressurized fluid at pump pressure to the chamber 10 by way of a conduit 9 which is attached to the conduit 8B by a union or junction 8. Pressurized fluid in the chamber 10 bears upon the end face or surface 5 of the piston 3 and opposes the combined bias of the spring 4 in the chamber 14 and of the fluid acting (at pilot pressure) upon the end face 6.

The conduit 8B contains a flow restrictor 11 which is installed downstream of the junction or union 8 and upstream of the consumer(s) C. The flow restrictor 11 (such as a standard throttle or an adjustable diaphragm defining one or more orifices having a preselected or adjustable combined cross-sectional area) causes the fluid pressure in the conduit 8B to drop from the system pressure (at 7) to a regulating pressure at a junction 12 between the flow restrictor 11 and the consumer(s) C. A conduit 13 connects the junction 12 (i.e., the conduit 8B) with an inlet 16a of the housing H. The inlet 16a admits fluid at pilot pressure into the chamber 14 at the end face 6 of the piston 3. Such pilot pressure is established by a second flow restrictor 11a which is provided in the conduit 13. Thus, the fluid pressure in the conduit 13 at the junction 12 matches or approximates the regulated pressure in the conduit 8B downstream of the flow restrictor 11, and the (pilot) pressure in the portion 13a of the conduit 13 downstream of the flow restrictor 11a matches the pressure in the chamber 14.

The pressure drop between the junctions 8 and 12 in the conduit 8B can be regulated by employing an adjustable flow restrictor 11. In other words, the flow restrictor 11 determines the rate of volumetric fluid flow to the consumer(s) C and to the conduit 13.

When the fluid pressure in the chamber 10 and/or 14 changes, pressurized fluid acting upon the end face 5 of the piston 3 causes the latter to change its axial position when the pressure of fluid in the chamber 10 rises to that value at which the pressure of hydraulic fluid in the chamber 14 is overcome and the spring 4 is compelled to yield. The piston 3 then moves in a direction to the left, and its recess 3a establishes communication between the inlet 7 and the outlet 16. Such no-regulation point denotes that stage of operation of the valve 1 when the pump P continues to deliver a quantity of fluid exceeding the then requirements of the consumer(s) C; the recess 3a then enables the surplus of supplied fluid to flow from the inlet 7 to the outlet 16, i.e., into the sump 15, and to be recirculated along an endless path preferably including that part of the sump 15 which supplies fluid to the intake of the pump P. It is also possible to convey the surplus fluid from the inlet 7 to one or more additional consumers and/or to a transmission cooling system and/or to one or more other parts of the apparatus embodying or being serviced by the valve 1 (e.g., in the power train of a motor vehicle).

It is not unusual that certain consumers of pressurized hydraulic fluid must receive fluid at elevated operating pressures (e.g., in the range of 100 bar ($10^7$ Pa)) while the volumetric rate of flow varies within a wide range. All this necessitates frequent adjustments in the position of the piston 3 relative to the valve housing H. Extensive experiments and observations of regulating valves in actual use indicate that, after extensive (long-lasting) use, certain parts of the periphery of the piston (particularly in the region adjacent the end face 6 of the piston 3 shown in FIG. 1) undergo pronounced wear (this also applies for the respective portions of the surface surrounding the passage 2 of the housing H) which entails extensive and highly undesirable widening of the gap between the periphery of the piston and the adjacent portion of the valve housing.

Those portions of the gap between neighboring surfaces of the piston (3) and housing (H) which extend between the spring chamber (14) and the outlet (16) leading to the reservoir (15) are normally maintained at atmospheric pressure. Consequently, the pressure differential between the spring chamber and the outlet to the reservoir for a conventional regulating valve can reach a pronounced value. If the wear upon the aforementioned portions of external and internal surfaces of the piston and the valve housing reaches a certain value, leakage of fluid from the spring chamber into the outlet leading to the reservoir becomes so pronounced that it affects the pressure of fluid which is being conveyed to the consumer(s).

In accordance with a feature of the invention, the valve 1 of FIG. 1 is provided with means for at least reducing leakage of fluid from the chamber 14 into the outlet 16 leading to the atmosphere (i.e., to the sump 15). Such leakage reducing means forms part of the piston 3 and includes an axial bore or hole 17 (hereinafter called bore) which communicates with the recess 3a (and thus with the inlet 7) as well as with a circumferentially complete annular groove 18 in the peripheral surface of the piston 3 in the region between the chamber 14 and the outlet 16. The fluid entering the clearance between the piston 3 and the valve housing H in the region of the groove 18 builds up an annular cushion wherein the pressure matches or approximates the pressure of fluid at the outlet of the pump P. Any differences between the system pressure (at the outlet of the pump P) and the pressure of the just discussed cushion between the piston 3 and the valve housing H in the region of the groove 18 are attributable to unavoidable losses due to friction and/or for certain other reasons.

The just described leakage reducing means 17, 18 prevents the pressure differential (between the chamber 14 and the outlet 16) from initiating the development of a stream or flow of leak fluid from the chamber 14 into the outlet 16. This is beneficial to the operation of the consumer(s) C because any fluid leaking from the chamber 14 into the outlet 16 actually leaks from the fluid flowing in the conduit 8B downstream of the flow restrictor 11, i.e., leak fluid can develop at the expense of fluid which, in the absence of leakage from the chamber 14, would be forced to flow to the consumer(s) C. The result of the novel undertaking is that the position of the no-regulation point remains unchanged and the supplying of the consumer(s) C with hydraulic fluid at an optimum pressure and in optimum quantities is not affected (or is less affected) by wear upon the parts H and 3 of the valve 1. It has been found that the aforedescribed novel undertaking remains effective for long periods of time, i.e., the operation of each consumer C remains unchanged in spite of potential or eventual development of wear upon the surfaces of the parts H, 3 in the region between the chamber 14 and the outlet 16.

Figure 1A:
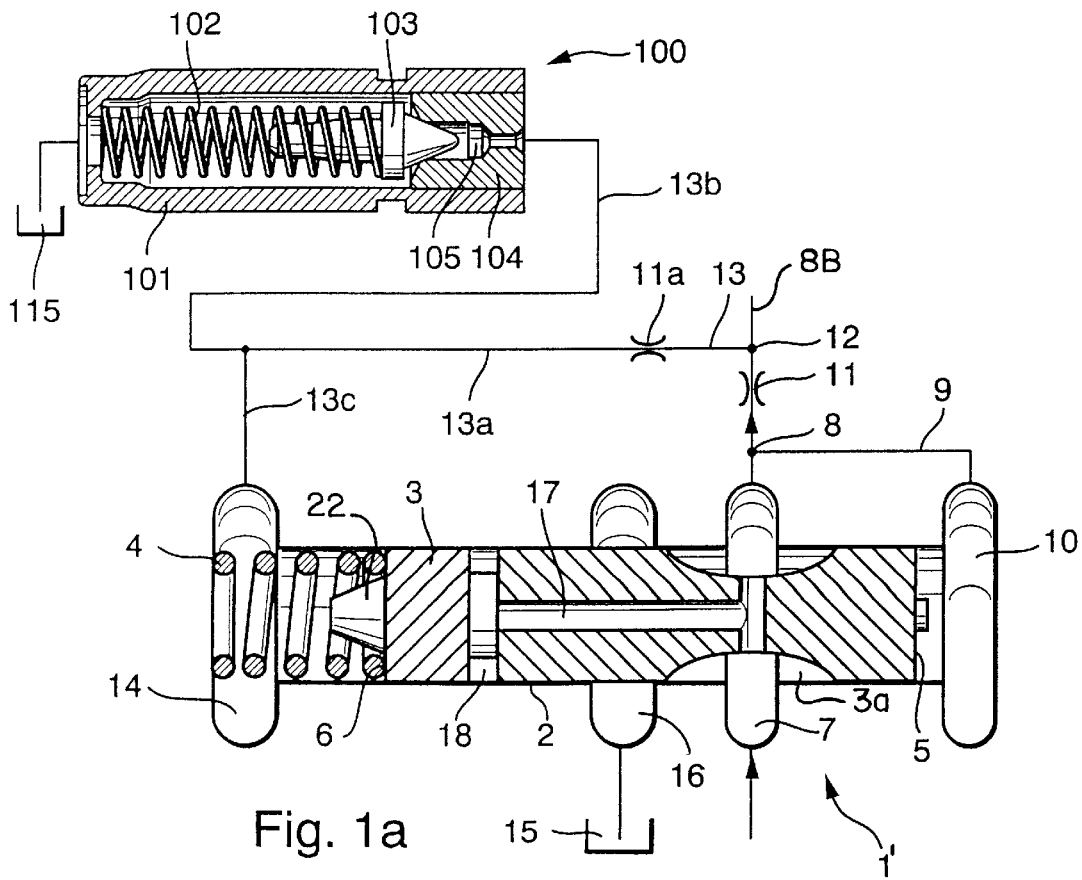
FIG. 1A is a similar view of the regulating valve of FIG. 1 and further shows certain details of a pilot valve which can influence the pressure of fluid in a chamber of the housing forming part of the regulating valve.

FIG. 1A shows a valve 1', which is practically identical with the valve 1 of FIG. 1, and a pilot valve 100 receiving hydraulic fluid from the conduit 13. In contrast to the valve 1 of FIG. 1, the portion 13a of the conduit 13 of the valve 1' of FIG. 1A has a branch 13c which supplies fluid to the chamber 14 and a branch 13b which supplies fluid to the housing or body 101 of the pilot valve 100.

The body 101 has an elongated passage for a reciprocable valving element or piston 103 which is biased by an energy storing device 102 here shown as a coil spring centered by a pyramidal or conical protuberance of the piston 103. The spring 102 tends to maintain the preferably conical right-hand end portion of the piston 103 in sealing engagement with a seat 104 which can be said to constitute a throttle having an orifice 105 arranged to receive fluid at a pressure determined by the flow restrictor 11a when the pilot valve 100 is at least partially open. The valve 100 then permits fluid to flow from the branch 13b into the sump 115. This takes place when the spring 102 is compelled to yield because the fluid pressure in the branch conduit 13b exceeds a threshold value.

If the fluid pressure at the inlet (13b) of the pilot valve 100 reaches a certain value, the product of such pressure and the effective area of the surface of the piston 103 entails the generation of a force which overcomes the bias of the spring 102 so that the piston 103 at least temporarily permits fluid to flow from the branch conduit 13b, through the valve body 101 and into the sump 115. The pressure in the branch conduits 13b, 13c and in the orifice 105 drops under the action of the flow restrictors 11a and 104. The pressure of fluid in the chamber 14 of the regulating valve 1' also decreases, and the pressure in the chamber 10 overcomes the combined pressure in the chamber 14 and the bias of the spring 4 so that the piston 3 is caused to move in a direction to the left. For example, the piston 3 of the valve 1' can assume an axial position in which the recess 3a establishes a path for the flow of fluid from the inlet 7 to the outlet 16, i.e., the rate of fluid flow into the conduit 8B is reduced accordingly.

The pilot valve 100 constitutes an optional but highly desirable feature of the improved fluid flow regulating apparatus.

Figure 2A:
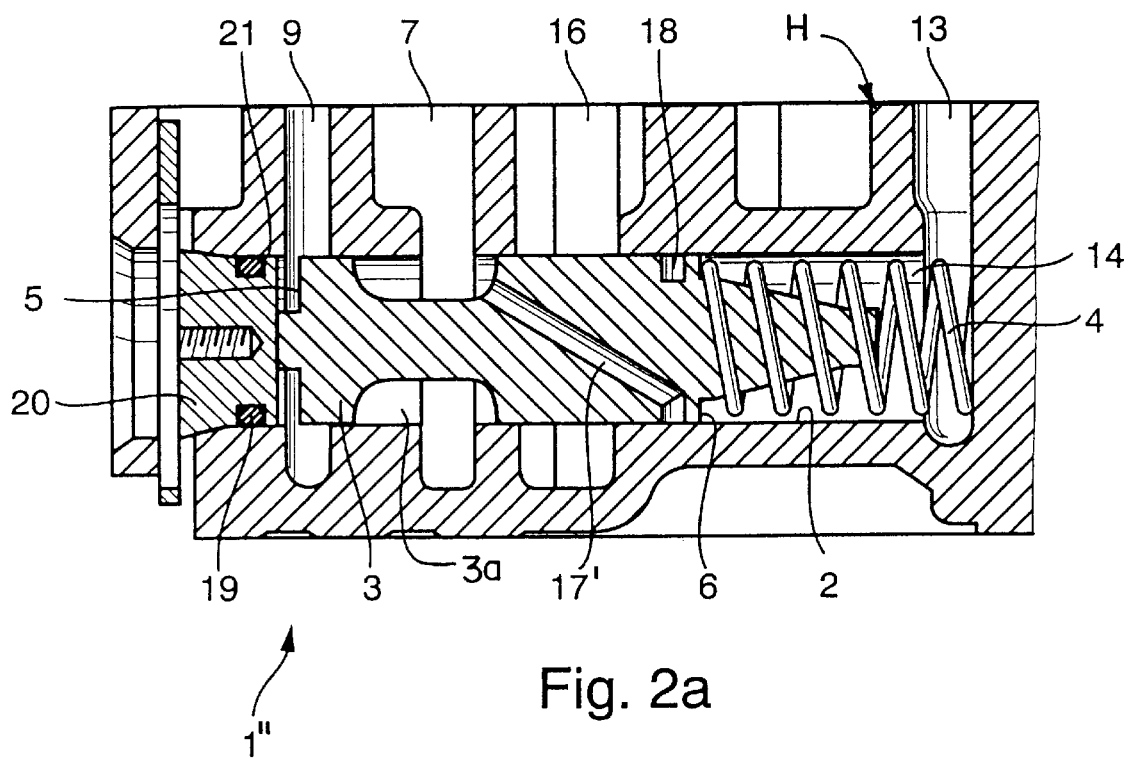
FIG. 2A is a fragmentary schematic partly elevational and partly sectional view of a modified regulating valve with the valving element in a sealing position.

FIG. 2A shows a valve 1" which is similar to the valve 1 of FIG. 1. The piston 3 is maintained in an axial position in which the inlet 7 is sealed from the outlet 16 in the same way as shown in and described with reference to FIG. 1. The spring 4 has dissipated at least some energy to maintain the piston 3 in the illustrated position. An annular sealing element 19 (e.g., a split ring) is recessed into a peripheral groove 21 of a plug 20 which seals the left-hand axial end of the passage 2 for the piston 3. The plug 20 must be removed prior to insertion of the piston 3 into or withdrawal of the piston 3 from the passage 2 of the valve housing.

The piston 3 has an end face 5 which is acted upon by fluid supplied by way of the conduit 9. When the pressure of fluid (e.g., oil) in the chamber adjacent the end face 5 suffices to overcome the bias of the spring 4, the piston 3 is shifted from the closed or closing position of FIG. 2A to the axial position of FIG. 2B in which the inlet 7 is free to communicate with the outlet 16 via recess 3a in the peripheral surface of the piston. The conduit 13 then admits into the chamber 14 hydraulic fluid at a lower pressure by way of the conduit 13 (the flow restrictor 11a is not shown in FIGS. 2A and 2B); the pressure of fluid which is admitted into the chamber 14 assists the bias of the spring 4 to maintain the piston 3 in the desired optimum axial position, i.e., to establish a state of equilibrium with the force being applied to the end face 5 of the piston.

Figure 2B:
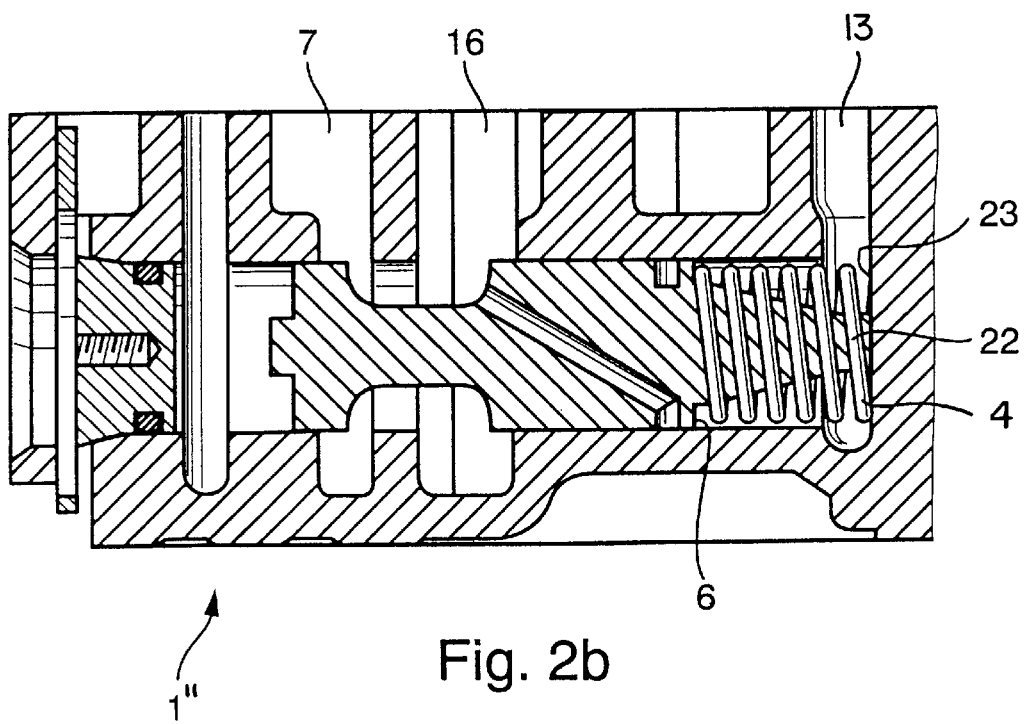
FIG. 2B shows the valve of FIG. 2A but with the valving elements in a different position.

A difference between the valves 1, 1' on the one hand and the valve 1" on the other hand is that the bore 17 of the piston 3 in the valve 1 or 1' is coaxial with the piston whereas, in FIGS. 2A and 2B, the bore 17' is inclined relative to the axis of the piston and its ends respectively communicate with the recess 3a and directly with the groove 18. The fluid in the groove 18 of the piston 3 shown in FIGS. 2A and 2B forms a cushion which prevents leakage (either any leakage or excessive leakage) of fluid between the chamber 14 and the outlet 16.

When the piston 3 of the valve 1" is held in the axial position of FIG. 2b, surplus fluid can flow from the inlet 7 to the outlet 16. At such time, the frustoconical centering portion 22 of the piston 3 abuts the inner side of an end wall of the valve housing H.

Figure 3:
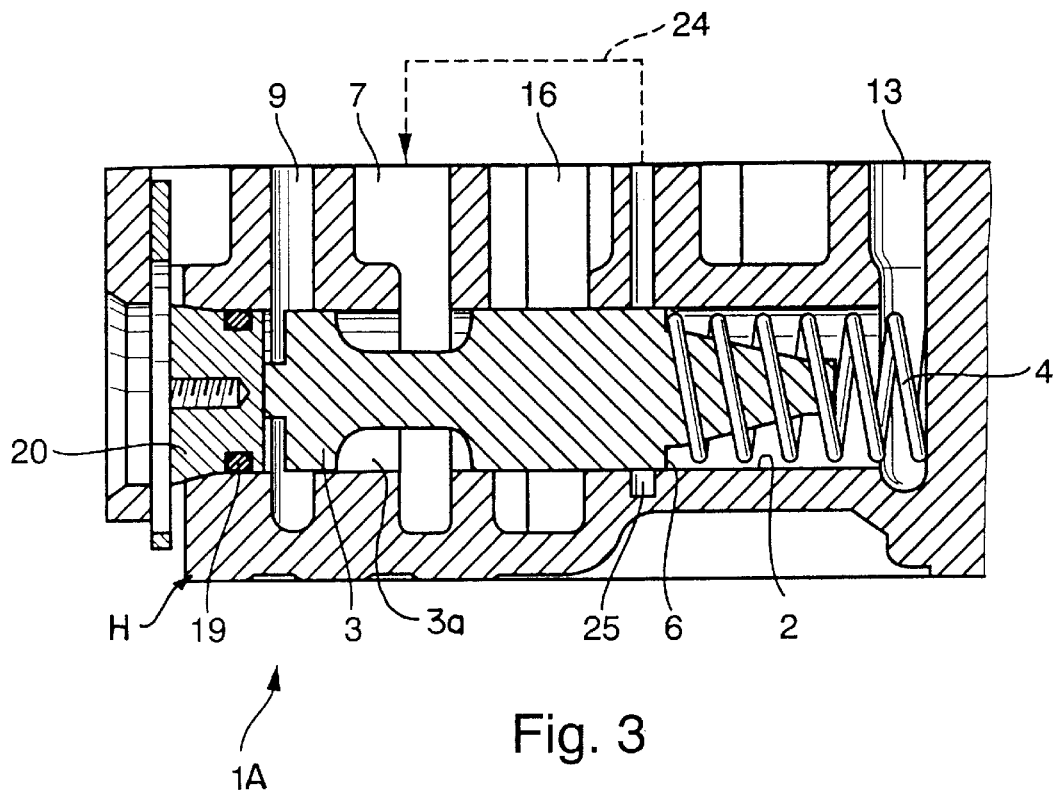
FIG. 3 is a fragmentary partly elevational and partly sectional view of a third regulating valve.

FIG. 3 shows a portion of a valve 1A wherein the bore 17 or 17' and the groove 18 are replaced with a first groove 24 provided in the valve housing H and communicating with the inlet 7, and an annular second groove 25 provided in the surface bounding the passage 2 adjacent the outlet 16. At least a portion of the groove 24 is or can be at least substantially parallel to the axis of the piston 3. The groove 25 is adjacent the end face 6 of the piston 3 when the latter assumes the axial position of FIG. 3; such position corresponds to the axial position of the piston 3 in FIG. 2A in which the recess 3a is sealed from the inlet 7 and from the outlet 16.

An advantage of the valve 1A is that its piston 3 can be mass produced at a lower cost because it need not be provided with an axially or otherwise oriented bore (17 or 17') and/or with an annular groove (18).

Figure 4A:
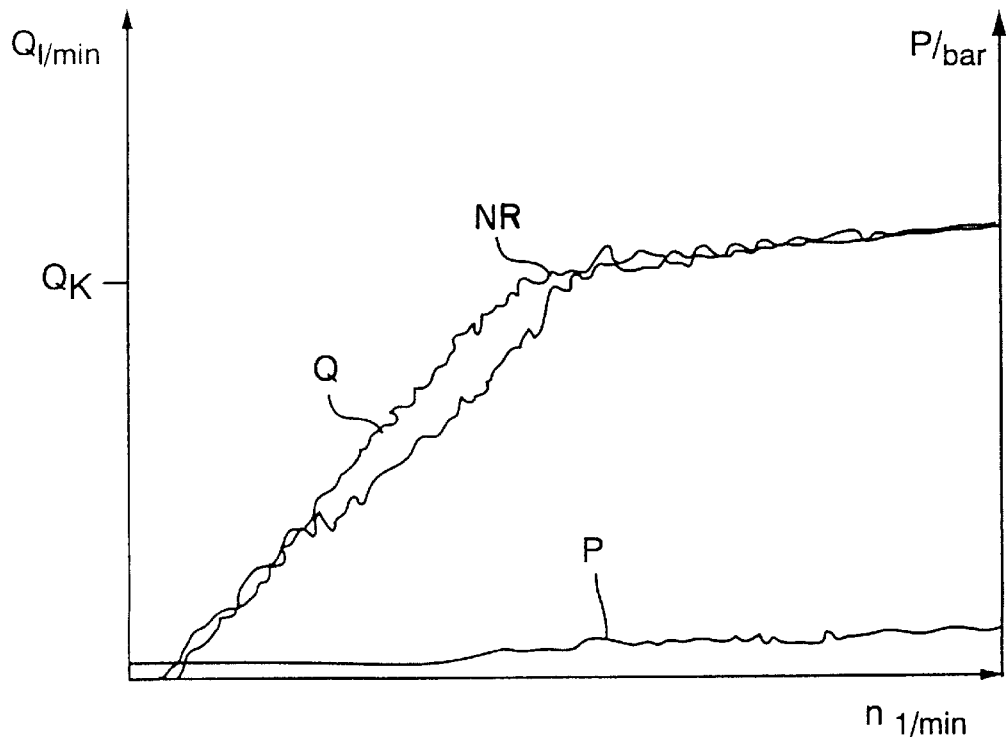
FIG. 4A shows a coordinate system wherein the curves indicate the rate of fluid flow at a relatively low pressure in a conventional regulating valve wherein the valving element and the valve housing are yet to undergo any wear or any appreciable wear.

FIG. 4A shows a coordinate system wherein the RPM (=n/1/min.) of the output element of the prime mover in the power train of a motor vehicle (such as the camshaft or the crankshaft of an internal combustion engine) is measured along the abscissa, and the rate Q of fluid flow (in liters per minute) is measured along the ordinate. The curve p denotes the changes of regulating fluid pressure at low operating pressures. The no-regulation point is shown at NR, and the characteristic volumetric flow is shown at $Q_K$. The pump (P in FIG. 1) which supplies pressurized hydraulic fluid to the inlet 7 of the regulating valve is assumed to be driven by the prime mover of the motor vehicle. The operating pressure P/bar is measured along the right-hand ordinate. The volumetric fluid flow Q is assumed to be normally less than 100 liters per minute, preferably about 60 liters per minute.

The valve 1 of FIG. 1 is assumed to be put to use in or in conjunction with a continuously variable transmission (CVT) for the purposes of regulating the pressure and the quantity of hydraulic fluid being pumped to one or more hydraulically operated units (such as cylinder-and-piston units) of the transmission. The transmission is assumed to require a volumetric fluid flow Q in the range of between 5 liters per minute and 30 liers per minute, preferably between 12 and 15 liters per minute. At the same time, the pressure p of fluid entering the consumer or consumers C should be in the range of between about 6 bar ($6*10^5$ Pa) and 100 bar ($10^7$ Pa). The surplus of fluid which should not enter the consumer(s) C is to be diverted by the regulating valve (e.g., by the valve 1) into the outlet 16 and hence into the sump 15.

In FIG. 4A, the curves denote various characteristics of a conventional regulating valve. The curve p indicates that the pressure of the fluid being supplied to the inlet corresponding to the inlet 7 shown in FIG. 1 is relatively low. The standard regulating valve which is utilized to arrive at the various curves of FIG. 4A is provided with a piston which is assumed to be moved from a fully closed position to a fully open position and back to the fully closed position. The curve Q in the coordinate system of FIG. 4A denotes the progress (with hysteresis) of the volumetric fluid flow through a conventional regulating valve which is still new or wherein the piston and the valve housing have undergone a minimum of wear or no wear at all. FIG. 4A shows that, at a characteristic volumetric fluid flow $Q_K$, the curve Q exhibits a pronounced (sharp) bend after a gradual rise from zero RPM of the output element of the prime mover, and the curve Q is thereafter substantially parallel to the abscissa to thus indicate that the consumer(s) receives or receive fluid at a rate (volumetric flow) which is at least substantially constant. In other words, the no-regulation point NR is located at the junction of the upwardly sloping and substantially horizontal portions of the curve Q.

Figure 4B:
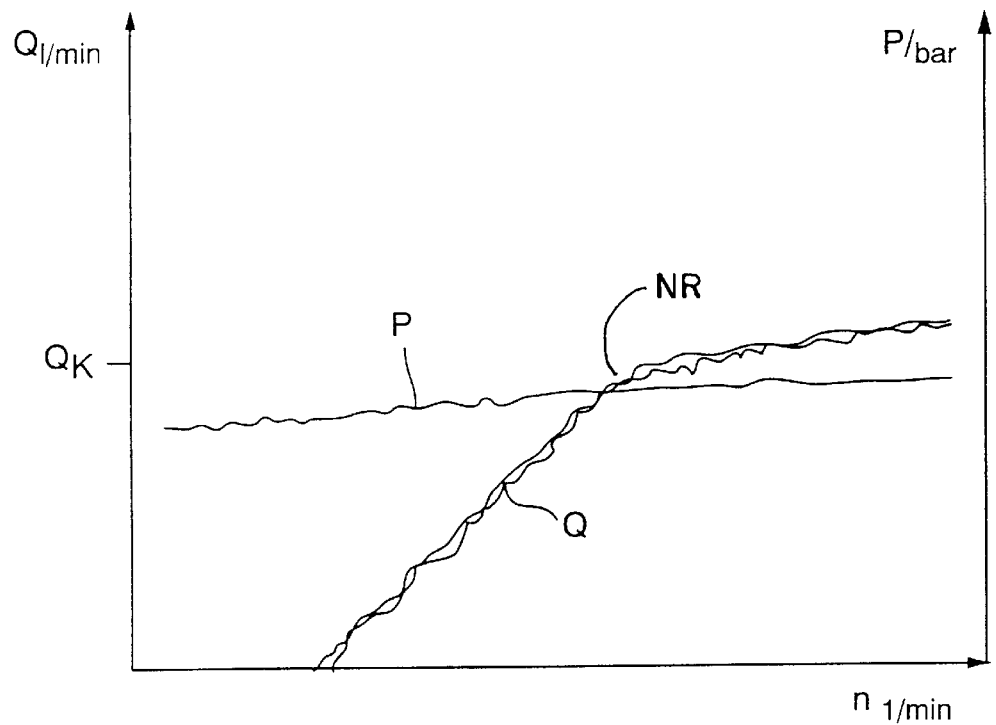
FIG. 4B shows a similar coordinate system but with the curves denoting volumetric fluid flow in a conventional regulating valve at a high operating pressure.

FIG. 4B shows a similar or analogous progress of curves p and Q which are indicative of the same parameters as the similarly referenced curves in the coordinate system of FIG. 4A. The difference is that the differential pressure denoted by the curve p of FIG. 4B is higher than in the coordinate system of FIG. 4A. The standard regulating valve is assumed to be new, i.e., it is yet to be put to use for an extended interval or period of time so that the wear upon the neighboring external and internal surfaces of the piston and the valve housing, respectively, is still nil or negligible. Here, again, the conventional regulating valve reduces the rate of fluid flow at and beyond the no-regulation point NR so that the curve Q is then at least substantially parallel to the abscissa.

Figure 5A:
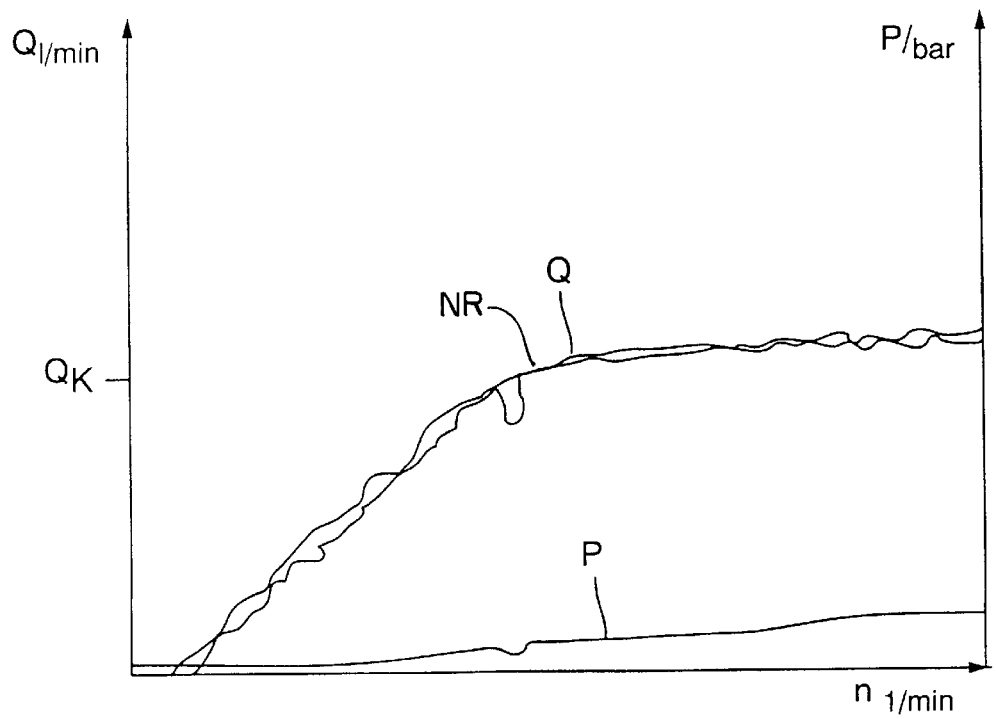
FIG. 5A shows a coordinate system with curves corresponding to those shown in FIG. 4A but upon extensive wear upon the valving element and/or upon the housing of a conventional regulating valve.

When the piston and the valve housing of a conventional regulating valve have undergone extensive wear (particularly along the internal surface of the valve housing and the sealing edge or edges at the periphery of the piston), this results in the flow of a gradually increasing stream of leak fluid from the spring chamber (corresponding to the chamber 14 for the spring 4 in the valve 1 of FIG. 1) to the adjacent outlet (such as the outlet 16 in the valve housing H of the valve 1). FIG. 5A shows the progress of various curves which denote certain parameters of a conventional regulating valve wherein the valve housing and the piston have already undergone a substantial amount of wear. The pressure p of the fluid is relatively low, the same as in the coordinate system of FIG. 4A. The characteristic curve p (at low pressure) shown in the coordinate system of FIG. 5a is similar to the curve p in the system of FIG. 4A.

Figure 5B:
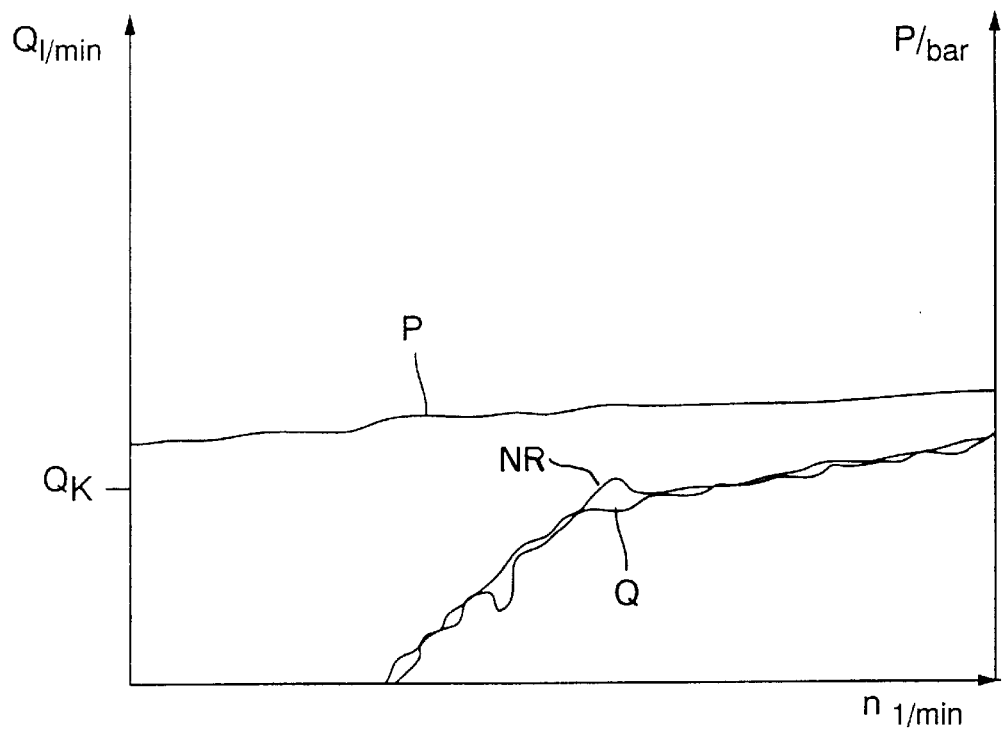
FIG. 5B shows a coordinate system corresponding to that of FIG. 4B but with curves denoting various parameters in a conventional regulating valve wherein the valving element and/or the housing has undergone extensive wear.

FIG. 5B shows a coordinate system with curves denoting various parameters of a conventional regulating valve. The curve Q represents the volumetric fluid flow at an elevated fluid pressure p and after the piston and the valve housing have undergone an extensive amount of wear. The no-regulation point NR is shifted by one or more liters per minute, e.g., by 3 liters. Thus, the consumer(s) receives or receive insufficient quantities of hydraulic fluid per unit of time. This alters the operational characteristics, i.e., the behavior, of the fluid consuming unit or units.

A shifting of the no-regulation point is caused by a stream or flow of leak fluid which originates in the chamber (corresponding to the chamber 14) for the energy storing means (corresponding to the spring 4) and (in the absence of an undertaking in accordance with the present invention) flows into an outlet (such as 16) of the valve housing. The rate of flow of leak fluid from the chamber for the energy storing means is dependent on the extent of wear upon the piston and the valve housing as well as upon the pressure in the chamber for the energy storing means, i.e., upon the pressure differential between the interior of such chamber and the outlet. In conventional regulating valves, this pressure differential can be very high because such valves do not employ an equivalent of the flow restrictor 11a and/or pilot valve 100. As a rule, or in many apparatus which employ conventional regulating valves, the rate of flow of leak fluid from the chamber for the energy storing means to the nearest or to a selected outlet is within the range of approximately 3 liters per minute.

Figure 6A:
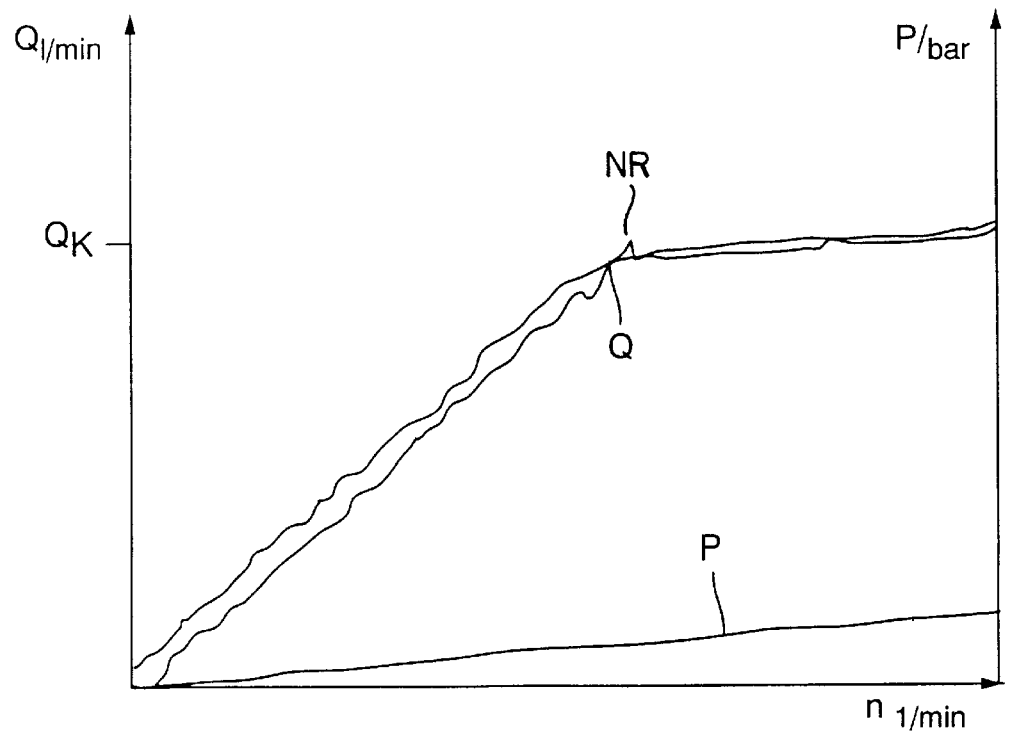
FIG. 6A shows a coordinate system with curves denoting changes of certain parameters during operation of a novel regulating valve wherein the valve housing has undergone extensive wear at low fluid pressure.

The coordinate system shown in FIG. 6A illustrates the volumetric fluid flow Q at a relatively low fluid pressure p when the regulating valve is constructed, assembled and operated in accordance with one feature of the present invention. It is assumed here that the source of pressurized hydraulic fluid (such as the pump P in the apparatus of FIG. 2A) is driven by the combustion engine in the power train of a motor vehicle. The RPM (i.e., n/minute) of the engine is measured along the abscissa of the coordinate system. The curve p in the coordinate system of FIG. 6A indicates that the RPM of the engine is very low. It is further assumed that the housing H in the valve 1" of FIG. 2A has already undergone extensive wear. The housing H can be that of a conventional regulating valve but the piston 3 is assumed to be constructed and configured in accordance with the present invention. Such piston can be made of an aluminum alloy with a coating consisting of hard oxide.

Figure 6B:
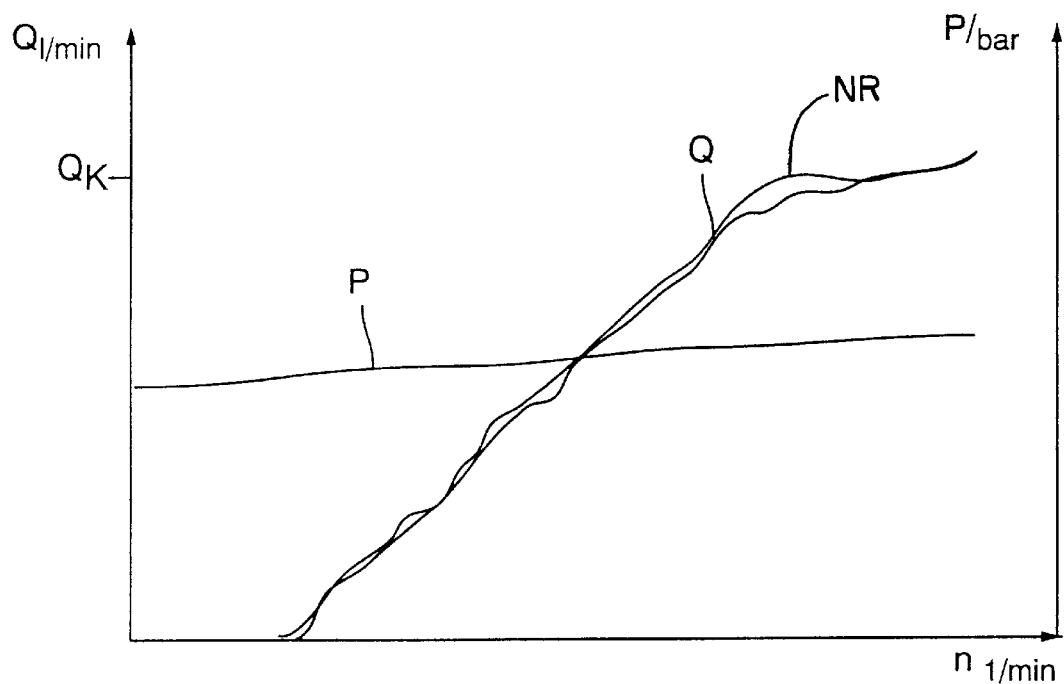
FIG. 6B shows the coordinate system of FIG. 6A but with the curves denoting parameters while the operating pressure is high.

A comparison of the coordinate systems of FIGS. 6A and 6B shows that the operating pressure under the circumstances represented in FIG. 6A is much lower than the pressure under the circumstances depicted in FIG. 6B. The no-regulation point NR is the same or nearly the same when the volumetric flow $Q_K$ is maintained at a certain characteristic value (as measured in liters per minute). The pressure is measured in bar. The curves of FIGS. 6A and 6B indicate that, by establishing and maintaining a liquid barrier or seal in the groove 18 of the piston 3 shown in FIGS. 2A and 2B, the amount of fluid in the stream or flow of leak fluid is zero or close to zero, even if the housing H has undergone a very pronounced wear and even if the operating pressure is high or very high. Otherwise stated, the no-regulation point NR of the valve 1" remains at least substantially unchanged in spite of extensive wear upon the valve housing H and after a long period of use of the motor vehicle. The volumetric flow is somewhat higher than under the aforediscussed circumstances represented in FIGS. 4A and 4B; this is attributable to a different initial stressing of the coil spring 4 shown in FIGS. 2A and 2B or an equivalent of such spring.

A very important advantage of the improved regulating valve is that the no-regulation point NR is not affected by some (or even extensive) wear upon the surface bounding the passage 2 of the valve housing H and even when the operating pressure (see FIG. 6B) is high or very high. This is attributable to the provision of the means (17, 18) for at least reducing leakage of the fluid from the chamber 14 into the outlet 16. It has been found that the position of the selected optimum no-regulation point NR remains at least substantially unchanged during the entire useful life of the improved regulating valve.

The preceding part of this description deals with the reduction or elimination (prevention) of that leak fluid flow (from the chamber 14 into the nearest outlet (such as 16) of the valve housing) which is attributable to progressing wear upon the adjacent surfaces of the piston and the valve housing. The remedial undertaking is intended to prevent any (or any appreciable) shifting of the no-regulation point NR. However, it is to be borne in mind that an undesirable shifting of the no-regulation point NR can also take place for reasons other than pronounced or less pronounced wear upon the piston and/or upon the valve housing. It has been found that the improved regulating valve can be put to use in order to eliminate or prevent undesirable shifting of the NR point (i.e., to counteract the tendency of the selected no-regulation point or locus to migrate) for reasons other than more or less extensive wear upon the part 3 and/or H.

For example, a change of the temperature of the hydraulic fluid (such as oil) is also a cause of or an inducement to shift the NR point. Thus, a temperature change entails a change of viscosity and an increase in the rate of flow of leak fluid in a conventional regulating valve which is devoid of any means for intercepting that fluid which would otherwise flow (leak) from the chamber for the energy storing means into the nearest outlet of the valve housing. Moreover, a rise in the temperature of the fluid and the attendant change of viscosity affects the rate of fluid flow through the orifices of the flow restrictors (such as 11 and 11a). Thus, the drop of fluid pressure between the upstream and downstream sides of a flow restrictor increases in response to a rise of temperature of the conveyed fluid. The improved undertakings to eliminate or to at least greatly reduce the flow of leak fluid (such as from the chamber 14 into the outlet 16) are equally effective in preventing a shift of the no-regulation point NR in response to heating of the fluid.

Figure 7:
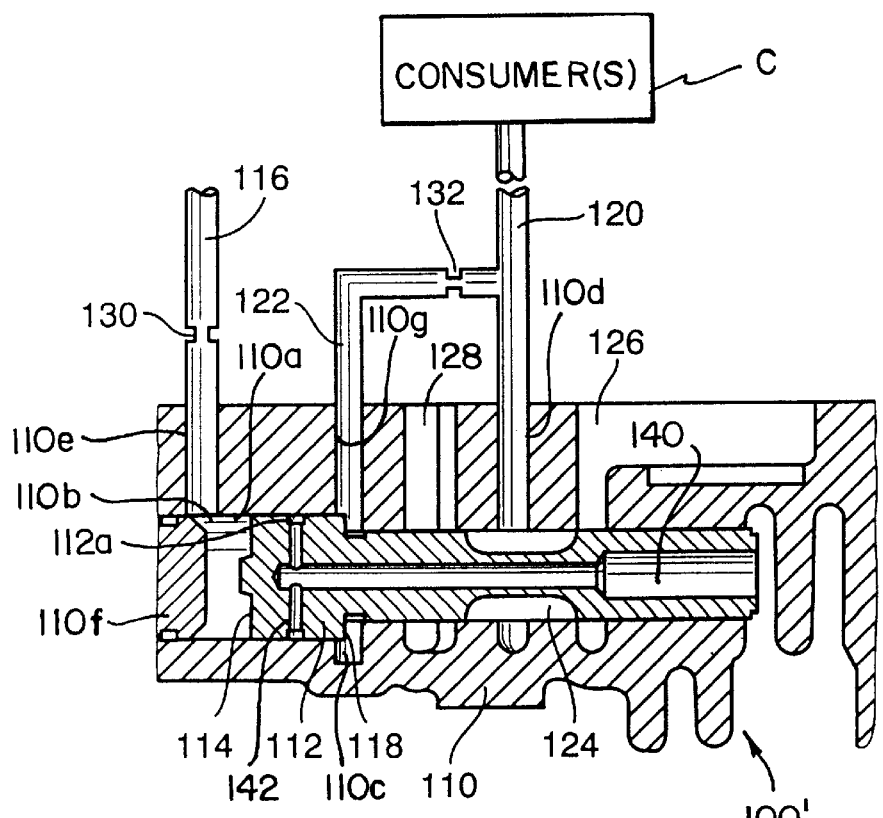
FIG. 7 is a fragmentary partly elevational and partly sectional view of an additional regulating valve which constitutes a converted conventional regulating valve or which can be converted into a valve embodying the present invention.

Referring to FIG. 7, there is shown a portion of a regulating valve 100' which comprises a housing or body 110 provided with a passage 110a having a larger-diameter portion and a smaller-diameter portion. This passage receives a reciprocable valving element or piston 112. The latter has a first annular surface 114 facing the adjacent plug 110f of the housing 110 and defining with the plug a first chamber 110b communicating with an outlet 110e. The chamber 114 receives hydraulic fluid at pilot pressure by way of a conduit 116 containing a flow restrictor 130.

An annular second surface 118 of the piston 112 faces away from the chamber 110b and defines with the housing 110 a second chamber 110c receiving fluid at regulating pressure from a conduit 120 containing a flow restrictor 132a and discharging into an inlet 110g of the housing 110.

An outlet 110d of the housing 110 discharges hydraulic fluid at pump (system) pressure into a conduit 120 which supplies fluid to one or more consumers C and to the conduit 122 upstream of the flow restrictor 132. The piston 112 has a circumferentially complete annular recess 124 which can connect an inlet 126 with the outlet 110d when the piston assumes an axial position to the right of that shown in FIG. 7. The piston 112 can be caused to assume at least one second axial position in which the recess 124 connects the outlet 110d with an outlet 128 corresponding to the outlet 16 in the valve housing H of he valve 1 shown in FIG. 1.

The operation of the valve 110' is as follows: When the conduit 120 receives pressurized fluid from the inlet 126 (via recess 124 of the piston 112), the flow restrictor 132 causes the chamber 110c at the surface 118 of the piston 112 to receive fluid at a regulating pressure. The fluid acts upon the surface 118 and tends to shift the piston 112 in a direction to the left, i.e., in a direction to reduce the volume of the chamber 110b. The ratio of pilot pressure of fluid in the chamber 110b to the regulating pressure in the chamber 110c corresponds to the ratio of the areas of the the surfaces 114 ants 118 at the respective chambers 110b and 110c. As a rule, the regulating pressure in the chamber 110c is higher than the pilot pressure in the chamber 110b. However, it might be necessary or desirable (under certain circumstances) to maintain the fluid in the chamber 110b at a pressure which is higher than the pressure in the chamber 110c.

The purpose of the flow restrictors 130, 132 in the respective conduits 116, 122 is to prevent the development of pulsating movements of the piston 112 due to fluctuations of fluid pressure and the resulting pronounced fluctuations of fluid pressure in to conduit 120. In presently known regulating valves, the ratio of the effective cross-sectional areas of the orifices defined by the flow restrictors 130, 132 is selected in such a way that the ratio of the cross-sectional area of the orifice (or the combined cross-sectional area of the orifices) defined by the flow restrictor 130 relative to the cross-sectional area (or the combined cross-sectional area) of the orifice (or orifices) defined by the flow restrictor 132 increases in response to increased pressure amplification of the valve. The (combined) area of the orifice (or orifices) defined by the flow restrictor 132 (where the fluid pressure is higher) is smaller than the (areas or) area of the orifice (or orifices) defined by the flow restrictor 130 where the fluid pressure is lower.

Figure 8:
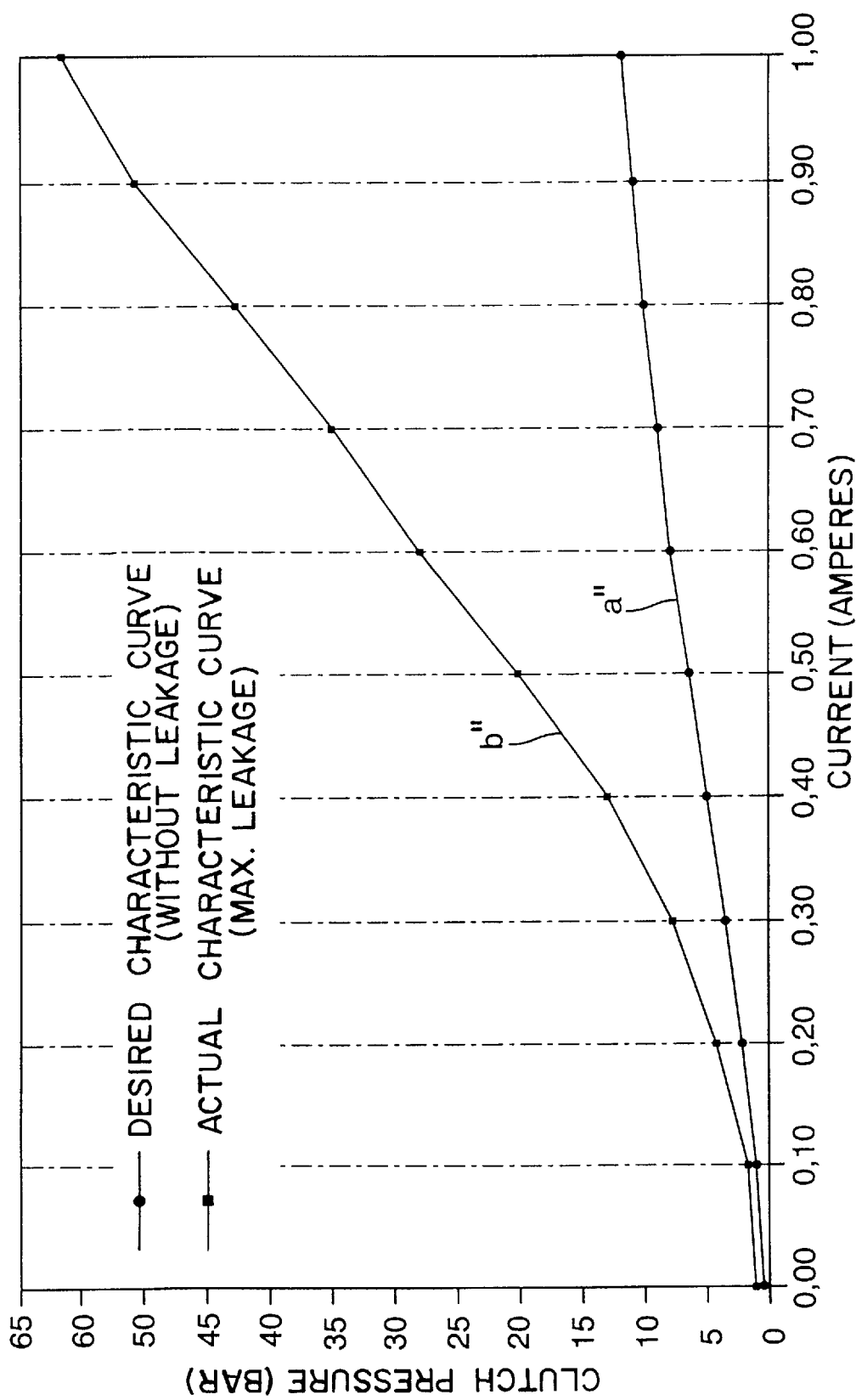
FIG. 8 shows a coordinate system in which the curves are indicative of the operation of the regulating valve of FIG. 7 prior to conversion in accordance with the present invention.

The curves in the coordinate system of FIG. 8 are characteristic of the mode of operation of a conventional regulating valve embodying the structure of FIG. 7. It is assumed here that the effective area of the surface 114 is 1 cm$^2$ and that the effective area of the surface 118 is 0.38 cm$^2$, i.e., that the geometric amplification or pressure transmission ratio equals or approximates 2.6. The orifices of the flow restrictors 130, 132 are assumed to be round, the diameter of the orifice of the flow restrictor 132 is assumed to be about 0.8 mm, and the diameter of the orifice of the flow restrictor 130 is assumed to match or approximate 1.3 mm.

The non-illustrated pilot valve (corresponding, for example, to the valve 100' shown in FIG. 1A) is assumed to be an electromagnetic valve and its current requirements (in Amperes) are measured along the abscissa of the coordinate system of FIG. 8. The pilot valve is adjustable, i.e., it can select the pilot pressure of the fluid in the conduit 116 and hence in the chamber 110b. The maximum current requirements of the pilot valve are in the range of 1A; this results in the selection of a maximum pilot pressure.

The conduit 120 is assumed to supply pressurized fluid at requisite pressure to a consumer C which constitutes or includes an automated clutch in the power train of a motor vehicle. The pressure of fluid (in bar) in the conduit 120 is measured along the ordinate in the coordinate system of FIG. 8.

The curve a' of FIG. 8 represents a desirable (optimum) relationship between the pilot pressure in the chamber 110b and the regulating pressure in the chamber 110c. Thus, if the pilot pressure in the chamber 110b is maintained at a maximum value, the regulating pressure in the conduit 120 is also at a maximum value (e.g., at least approximately 112 bar). Such characteristic curve a' can be arrived at when the temperature of the hydraulic fluid is normal and the clearance for leakage of fluid between the adjoining surfaces of the piston 112 and the valve housing 110 is nil or practically nil.

The curve b' in the coordinate system of FIG. 8 represents the relationship between the pilot pressure in the chamber 110b and the regulating pressure in the chamber 110c when the temperature of the fluid has risen to 150° C. (i.e., when the viscosity of the fluid is low). Furthermore, at least one of the neighboring surfaces of the piston 112 and the housing 110 exhibits at least some wear to thus establish a path for the flow of leak fluid. By making the piston 112 and the housing 110 of aluminum, one can avoid pronounced changes of the clearance(s) between the piston and the housing in response to heating of the fluid. FIG. 8 shows that the maximum regulating pressure equals or approximates 60 bar; such pressure is excessive because it not only exerts an adverse influence upon the operation but it can also bring about a total destruction of an automated transmission.

Figure 9:
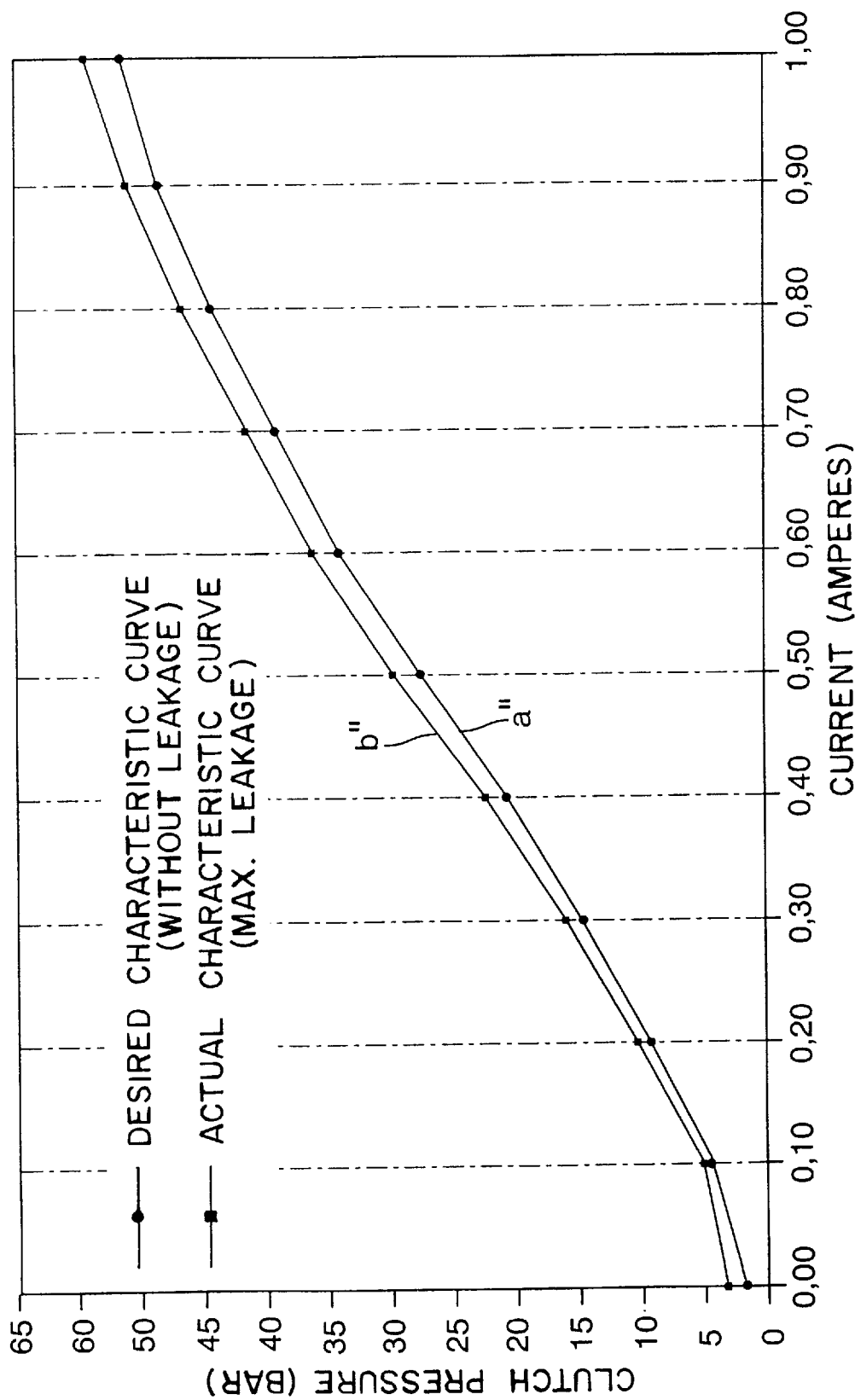
FIG. 9 shows a coordinate system similar to that of FIG. 8 but with the curves denoting various parameters of the valve of FIG. 7 subsequent to conversion into a regulating valve which embodies still another form of the present invention.

If the valve 110' of FIG. 7 is constructed in accordance with the present invention (see the axial bore 140 and the circumferential groove 112a of the piston 112 as well as the radial bores 142 between 140 and 112a), the operation of the valve 110' is improved as indicated by the curves a" and b" in the coordinate system of FIG. 9. The reasons for pronounced deviations of the curves a', b' shown in FIG. 8 from the curves a", b" shown in FIG. 9 are as follows: A valve with characteristic curves (a', b') of the type shown in FIG. 8 does not embody any mans for preventing leakage of fluid from the chambers 110b and 110c. Leakage of fluid at pilot pressure from the chamber 110b entails a drop of pilot pressure, i.e., of fluid pressure upon the surface 114. The drop of regulating pressure in the conduit 122 and chamber 110c, combined with leakage of fluid from this chamber, brings about a reduction of fluid pressure upon the surface 118 of the piston 112. The situation is aggravated if the temperature of the fluid rises because the orifice of the flow restrictor 132 is much smaller than that of the flow restrictor 130 and the pressure of fluid downstream of the flow restrictor 130 is much lower than downstream of the flow restrictor 132. The piston 112 moves axially to select the regulating pressure in the chamber 10c until the establishment of an equilibrium between the pilot pressure and the regulating pressure; the latter pressure rises to a value which is higher, even much higher, than that which is warranted in view of the design of the apparatus embodying the aforedescribed fluid flow regulating valve 110' (without the novel features).

If the cross-sectional area of the orifice in the flow restrictor 132 is selected to exceed that of the orifice defined by the flow restrictor 130 (it being assumed that the regulating pressure exceeds the pilot pressure), the pressure of fluid at the surface 118 rises at a relatively low rate so that the pressure losses at the flow restrictor 130 balance or substantially balance pressure losses at the flow restrictor 132. This, in turn, ensures that the constructive pressure amplification relationship (as determined by the ratio of the areas of the surfaces 114 and 118) remains at least substantially unchanged. However, once the effective pressure amplification increases somewhat in response to increasing losses due to leakage of fluid, this is not overly damaging as concerns the thus achieved maximum regulating pressure because the maximum effective pilot pressure drops owing to pressure losses at the flow restrictor 130.

A quantitative estimate can be arrived at as follows:

It is assumed that $p_{ST}=p_{VST}\times V$ (equation I) wherein $p_{ST}=$ regulating pressure, $p_{VST}=$pilot pressure, and V=ratio of the areas of the surfaces 114 and 118 of the piston 112.

More particularly, $p_{ST}-\Delta p_{ST}=V(p_{VST}-\Delta p_{VST})$ (equation II), wherein $\Delta p_{VST}=$pressure drop at the flow restrictor 130 and $\Delta p_{ST}$ is pressure drop at the flow restrictor 132.

The equation II indicates that, at a given $p_{VST}$, the regulating pressure increases if $\Delta p_{ST}$ is greater than $V \times \Delta p_{VST}$.

To summarize: The ratio K of the diameters of (normally round) orifices of the flow restrictors 130, 132 preferably depends upon the ratio V of the area of the surface 114 to the area of the surface 118 and/or upon the ratio of leak fluid flow through the flow restrictor 130 to the leak fluid flow through the flow restrictor 132. K preferably exceeds 1 if V exceeds 1 and the ratio $Q_{VST}/Q_{ST}$ exceeds 1. A more detailed or more accurate mathematical analysis indicates that it is advisable to select the dimensions in accordance with the equation $K=V^{1/4} \cdot (Q_{VST}/Q_{ST})^{1/2}$ wherein K=ratio of the diameter of the orifice of the flow restrictor 130 to the diameter of the orifice of the flow restrictor 132, V=ratio of the area of the surface 114 to the area of the surface 118, $Q_{VST}=$leak fluid flow through the flow restrictor 130, and $Q_{ST}=$leak fluid flow through the flow restrictor 132.

In accordance with a presently preferred embodiment of the invention, the dimensions of various components of the valve 100' shown in FIG. 7 are selected in such a way that the diameter of the orifice of the flow restrictor 130 is reduced from 1.3 mm to 1.2 mm but the diameter of the orifice of the flow restrictor 132 is increased from 0.8 mm to 2 mm, i.e., well above the diameter of the orifice of the flow restrictor 130. Such modification of the valve 100' results in a change of the mode of operation as represented by the curves a" and b" in the coordinate system of FIG. 9. A comparison with the curves A', b' of FIG. 8 indicates that the curve b" quite closely follows the curve a". Moreover, the curve b" (which is indicative of the operation at highly elevated temperatures in the range of 150° C.) does not indicate the development of high regulating pressures. In fact, the maximum regulating pressure is or approximates 12 bar in contrast to 60 bar as indicated by the curve b' in the coordinate system of FIG. 8.

The improved method and valve can be put to use in conjunction with a number of different consumers, for example, in the power train of a motor vehicle. Thus, the consumer C shown in FIG. 1 or in FIG. 7 can constitute a CVT or another continuously or infinitely variable transmission, a stepwise shiftable (such as a manual) transmission or an automated clutch. The pilot valve 100 is or can constitute an electromagnetic or another suitable valve which is capable of selecting a desired or a required pilot pressure. It is desirable, in many instances, to select a relatively high pilot pressure the exact value of which can depend upon one or more parameters. For example, the selected pilot pressure will be relatively high if a consumer C is a clutch, such as an automated clutch. The number and the exact nature of the flow restrictors also depend upon one or more variables, e.g., on the desired extent of damping oscillations of the valving element in the passage of the valve housing.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of volumetric fluid flow regulating methods and valves and, therefore, such adaptations should and are intended to be comprehended within the meaning and range of equivalence of the appended claims.

What is claimed is:

1. Volumetric fluid flow regulating valve, comprising:
   a housing having an elongated passage, at least one inlet arranged to receive pressurized hydraulic fluid from a source, a first outlet connectable to a reservoir, and a second outlet;
   a valving element reciprocable in said passage and having first and second end portions, said passage including first and second chambers respectively adjacent said first and second end portions and said valving element being movable relative to said housing between first and second positions in which said first and second outlets respectively receive fluid from said inlet;
   energy storing means provided in said first chamber to bias said valving element in a direction to reduce the volume of said second chamber;
   means for connecting said second outlet with said second chamber;
   at least one fluid pressure reducing device in a conduit connecting said second outlet with at least one consumer;
   means for connecting said first chamber with said conduit downstream of said pressure reducing device; and
   means for at least reducing leakage, if any, of fluid between said first chamber and said first outlet.

2. The valve of claim 1, wherein the fluid pressure in said first chamber normally differs from fluid pressure in said first outlet and said leakage reducing means includes means for at least reducing the differential between the fluid pressures in said first chamber and said first outlet.

3. The valve of claim 1, wherein said housing has an internal surface surrounding said passage and including a portion extending between said first chamber and said first outlet, said leakage reducing means including means for maintaining between said valving element and said portion of said internal surface a fluid pressure at least approximating fluid pressure in said second outlet.

4. The valve of claim 3, wherein said means for maintaining includes at least one bore provided in said valving element.

5. The valve of claim 4, wherein said valving element has a longitudinal axis and said at least one bore is inclined relative to said axis.

6. The valve of claim 3, wherein said maintaining means comprises at least one groove provided in said internal surface.

7. The valve of claim 6, wherein at least a portion of said at least one groove is at least substantially parallel to a longitudinal axis of said valving element.

8. The valve of claim 3, wherein said valving element has an external surface surrounded by said internal surface, said means for maintaining including a bore provided in said valving element and communicating with said inlet at least in said second positions of said valving element, said bore further communicating with an annular groove provided in one of said internal and external surfaces.

9. The valve of claim 1, wherein said energy storing means comprises at least one spring and said first end portion of said valving element comprises means for centering said at least one spring in said first chamber.

10. The valve of claim 1, wherein said at least one consumer comprises a continuously variable transmission.

11. A method of preventing a rise of the pressure of a fluid above a preselected threshold value in a regulating valve wherein a housing has an elongated passage for a reciprocable valving element having first and second end portions, an inlet for a pressurized fluid and first and second outlets respectively connectable to a reservoir and at least one consumer, wherein the passage respectively incudes first and second chambers at the respective end portions of the valving element, and wherein at least one energy storing device is provided in the first chamber to urge the valving element in a direction to reduce the volume of the second chamber, comprising the steps of:
    establishing a path for the flow of leak fluid, if any, between said first chamber and said first outlet; and
    maintaining the pressure of fluid in said path at a value which at least approximates the pressure of fluid at said second outlet.

12. The method of claim 11, wherein the fluid is a hydraulic fluid and said first step comprises establishing an at least substantially circumferentially complete path in at least one of the valving element and the housing.

13. The method of claim 12, further comprising the step of pumping the pressurized fluid into the at least one path by way of said inlet.

14. Volumetric flow regulating valve, comprising:
    a housing having a passage, first and second inlets arranged to receive pressurized fluid, a first outlet connectable to a reservoir, and a second outlet;
    a valving element reciprocable in said passage and having (a) a first surface having a first area and defining with said housing a first fluid-containing chamber communicating with said first inlet, (b) a second surface having a second area and defining with said housing a second fluid-containing chamber, and (c) a peripheral recess;
    means for supplying to said first chamber fluid at a first pressure;
    a source of pressurized fluid connected to said second inlet;
    means for maintaining the pressure of fluid in said second chamber at a regulating pressure, said valving element being movable in said passage between at least one first position in which said second inlet communicates with said second outlet and at least one second position in which said second inlet communicates with said first outlet, the ratio of said first area to said second area at least approximating the ratio of said first pressure to said regulating pressure;
    a first flow restrictor provided in said supplying means; and
    a second flow restrictor provided in a conduit forming part of said maintaining means and connecting said second outlet with said second inlet, said first and second flow restrictors respectively defining first and second orifices for the flow of fluid to the respective chambers and the ratio K of the areas of said first and second orifices corresponding to a factor of the ratio V of the area of said first surface to the area of said second surface and the ratio $Q_{VST}/Q_{ST}$ of the volumes of leak fluid flow, if any, through the first orifice and the second orifice, K>1 when V>1 and Q>1.

15. The valve of claim 14, wherein $$K=V^{1/4} \cdot (Q_{VST}/Q_{ST})^{1/2}$$

and wherein V=ratio of the area of the first surface to the area of he second surface, $Q_{VST}$ is the volumetric flow of leak fluid through said first orifice, and $Q_{ST}$ is the volumetric flow of leak fluid through said second orifice.

16. A method of compensating for temperature-induced changes of a regulating fluid pressure established by a valve which is operated by fluid at a pilot pressure supplied by a first conduit containing a first flow restrictor and wherein a valve housing defines a passage for a reciprocable valving element having a first surface defining with the housing a first chamber receiving fluid at pilot pressure from the first conduit by way of a first inlet of the housing, the housing further having a second inlet connectable with a source of regulating fluid, a first outlet and a second outlet, the valving element further having a second surface defining with the housing a second chamber receiving fluid at regulating pressure by way of a second flow restrictor in a second conduit and a recess arranged to establish communication between the first chamber and the first outlet in at least one first position of the valving element, and between the second inlet and the second outlet in at least one second position of the valving element, comprising the steps of:

maintaining the ratio of pilot pressure to regulating pressure at least close to the ratio of the area of the first surface to the area of the second surface; and maintaining the ratio of the orifice size in the first flow restrictor to the orifice size in the second flow restrictor at a value at which the influences of pressure losses at the orifices due to leakage, if any, of hydraulic fluid between the housing and the valving element upon the regulating pressure at least substantially balance each other.

17. The method of claim 16, wherein the pressure of fluid in the second chamber upon the valving element opposes the pressure of fluid upon the valving element in the first chamber.

18. The method of claim 16, further comprising the step of biasing the valving element in a direction to increase the volume of the first chamber.

19. The method of claim 16, further comprising the step of sealing the valving element against the valve housing in the passage between the first chamber and the first outlet.

20. The method of claim 16, further comprising the step of connecting the second outlet to at least one consumer of fluid at said regulating pressure.

\* \* \* \* \*